(12) United States Patent
Croissant et al.

(10) Patent No.: US 9,242,197 B2
(45) Date of Patent: Jan. 26, 2016

(54) FILTER ELEMENT AND METHOD FOR PRODUCTION THEREOF

(71) Applicant: MANN+HUMMEL GMBH, Ludwigsburg (DE)

(72) Inventors: Horst Croissant, Hochstadt (DE); Claudia Schaeffer, Speyer (DE); Heiko Eberle, Lambsheim (DE)

(73) Assignee: MANN+HUMMEL GMBH, Ludwigsburg (DE)

(*) Notice: Subject to any disclaimer, the term of this patent is extended or adjusted under 35 U.S.C. 154(b) by 0 days.

(21) Appl. No.: 14/192,647

(22) Filed: Feb. 27, 2014

(65) Prior Publication Data

US 2014/0260141 A1   Sep. 18, 2014

Related U.S. Application Data

(63) Continuation of application No. PCT/EP2012/066417, filed on Aug. 23, 2012.

(30) Foreign Application Priority Data

Aug. 29, 2011   (DE) .......................... 10 2011 111 366

(51) Int. Cl.
    *B01D 46/00*   (2006.01)
    *B01D 46/52*   (2006.01)

(52) U.S. Cl.
    CPC ........ *B01D 46/0002* (2013.01); *B01D 46/0001* (2013.01); *B01D 46/0004* (2013.01); *B01D 46/0005* (2013.01); *B01D 46/52* (2013.01); *B01D 46/525* (2013.01); *B01D 2271/022* (2013.01); *B01D 2271/025* (2013.01)

(58) Field of Classification Search
    CPC .......... B01D 46/0004; B01D 46/0005; B01D 46/525; B01D 46/526; B01D 46/527; B01D 2271/02; B01D 2271/022; B01D 2271/025; B01D 46/0002
    See application file for complete search history.

(56) References Cited

U.S. PATENT DOCUMENTS

| | | | | |
|---|---|---|---|---|
| 6,159,261 A | * | 12/2000 | Binder et al. | 55/502 |
| 2007/0175187 A1 | * | 8/2007 | Kopec et al. | 55/385.3 |
| 2010/0229513 A1 | * | 9/2010 | Eisengraeber-Pabst et al. | 55/385.3 |
| 2010/0242425 A1 | * | 9/2010 | Swanson et al. | 55/498 |

FOREIGN PATENT DOCUMENTS

| | | | |
|---|---|---|---|
| DE | 19634720 A1 | * | 3/1998 |
| DE | 202005013293 U1 | | 12/2006 |
| EP | 1380334 A1 | * | 1/2004 |

OTHER PUBLICATIONS

German office action on DE 10 2011 111 366.9, dated Jul. 13, 2012.

\* cited by examiner

*Primary Examiner* — Robert Clemente
(74) *Attorney, Agent, or Firm* — James Hasselbeck

(57) ABSTRACT

A filter element for filtering air includes a filter body (2) and a seal arrangement (3). The seal arrangement includes a seal member secured onto the filter body (2) extending circumferentially about the filter body (2). The seal member forms a groove (11) inside the seal member; the groove opening to the exterior of the seal member on a first side of the seal member and includes an elastic plastic foam (4) operable to form a seal is arranged in the groove (11).

9 Claims, 4 Drawing Sheets

FILTER ELEMENT AND METHOD FOR PRODUCTION THEREOF

CROSS-REFERENCE TO RELATED APPLICATIONS

This application is a bypass continuation application of international application No. PCT/EP2012/066417 having an international filing date of Aug. 23, 2012 and designating the United States, the international application claiming a priority date of Aug. 28, 2011, based on prior filed German patent application No. 10 2011 111 366.9, the entire contents of the aforesaid international application and the aforesaid German patent application being incorporated herein by reference.

TECHNICAL FIELD

The present invention concerns a filter element, for example, for use as an air filter for the intake air of an internal combustion engine of a motor vehicle. Moreover, a filter arrangement and a method for producing a corresponding filter element is disclosed.

In the mounted state, such filter elements are present in housings or filter receptacles. In this context, the clean air region is to be separated from the raw air region as tightly as possible.

BACKGROUND

EP 1 813 342 A1, for example, discloses a filter element for the intake air of an internal combustion engine. The filter element described therein has a filter body with a seal. The seal comprises a hard component and a soft component wherein the seal is connected by an adhesive with the filter body. Due to the hard component which is resting directly on the housing part, the relative movements relative to this housing part are to be prevented. The proposed filter element requires a complex manufacturing process and seals that are matched to the respective housing shapes.

SUMMARY OF THE INVENTION

It is therefore the object of the present invention to provide an improved filter.

Accordingly, a filter element is proposed which is provided with a filter body and a seal that is arranged so as to circumferentially extend about the filter body. In this context, the seal has a groove in which at least partially an elastic plastic foam is arranged.

In particular, the seal has preferably a groove in which at least partially an elastic plastic foam is injected.

The filter element is preferably embodied as a filter element for intake air of an internal combustion engine of a motor vehicle. Moreover, the filter element can be suitable for filtering operating media, for example, oil, intake air, gasoline or other fuels or even exhaust gas as a fluid.

The plastic foam which may comprise, for example, polyurethane, provides preferably an axial sealing action when the filter element is inserted. This means that, due to contact surfaces, axial forces are acting along a longitudinal axis of the filter element, which is inserted into a housing or a receptacle, on the plastic foam that is compressed thereby and effects sealing.

Preferably, a groove opening is oriented parallel to a surface of the filter body. In case of a cylinder-shaped filter element, for example, the groove of the seal is preferably oriented such that the opening of the groove is oriented in the direction of an inflow or outflow side for the fluid to be filtered.

The filter element can be furnished, for example, with a seal which comprises two legs that extend substantially parallel to the surface of the filter body and a leg that is arranged substantially perpendicular to the surface of the filter body. For example, a U-shaped sealing profile results wherein the two parallel legs of the resulting U are present so as to extend circumferentially parallel to the surface of the filter body. Into the opening of the U or into the groove, a suitable elastic plastic foam can be cast or injected.

Preferably, the plastic foam is made of a material which is thixotropic upon injection into the groove. The use of thixotropic foam materials, for example, polyurethane, has the advantage that, when producing a filter element, the latter can be present practically in any orientation. The thixotropic properties during the manufacturing process enable a fast and inexpensive realization of the sealing concept.

It is moreover conceivable that the plastic foam projects away from the groove. For example, the foam that is initially cast into the groove can enlarge the volume during its reaction time so that in the cured state of the plastic foam it projects elastically away from the groove. The height of the seal is therefore flexibly determinable during manufacture.

The seal can have a hard component and a soft component. By means of the hard component, it can be prevented, for example, that in the mounted state of the filter element the filter element cannot perform relative movements relative to a housing receptacle.

The hard component can rest on the surface of the filter body, for example, can be attached by means of an adhesive. The soft component which preferably forms the groove can be compressed or deformed in the mounted state together with the injected plastic foam and in this way can provide a particularly seal-tight closure with the support surfaces of the housing.

Preferably, the seal is connected by means of an adhesive on the filter body.

It is easy to first produce the filter element as well as the seal individually or separately and, in the actual manufacturing process, bond them to each other. In this context, the seal can be extrusion-molded, pre-manufactured as a ring, or can be existing as continuous material.

Also, a filter arrangement is proposed in which a filter element as described above is inserted into a filter receptacle or a filter housing and wherein the seal separates seal-tightly a raw fluid region from a clean fluid region.

Moreover, a method for producing a filter element is proposed which comprises the steps: attaching a seal extending circumferentially on the filter body wherein the seal has a groove. And injecting an elastic plastic foam at least partially into the groove.

Preferably, this is a method for producing a filter element for intake air of an internal combustion engine of a motor vehicle.

Further possible implementations of the invention comprise also combinations that are not explicitly mentioned of features or embodiment forms, described above or in the following, with regards to the embodiments. In this context, a person of skill in the art will add also individual aspects as improvements or supplements to the respective basic form of the invention.

Further embodiment variants of the invention are the subject matter of the dependent claims as well as of the embodiments of the invention disclosed in the following. In the following, the invention will be explained in more detail with the aid of embodiments with reference to the attached Figures.

BRIEF DESCRIPTION OF THE DRAWINGS

It is shown in.

In the Figures, same reference characters identify same or functionally the same components, inasmuch as nothing to the contrary is indicated.

DETAILED DESCRIPTION

Figure 1:
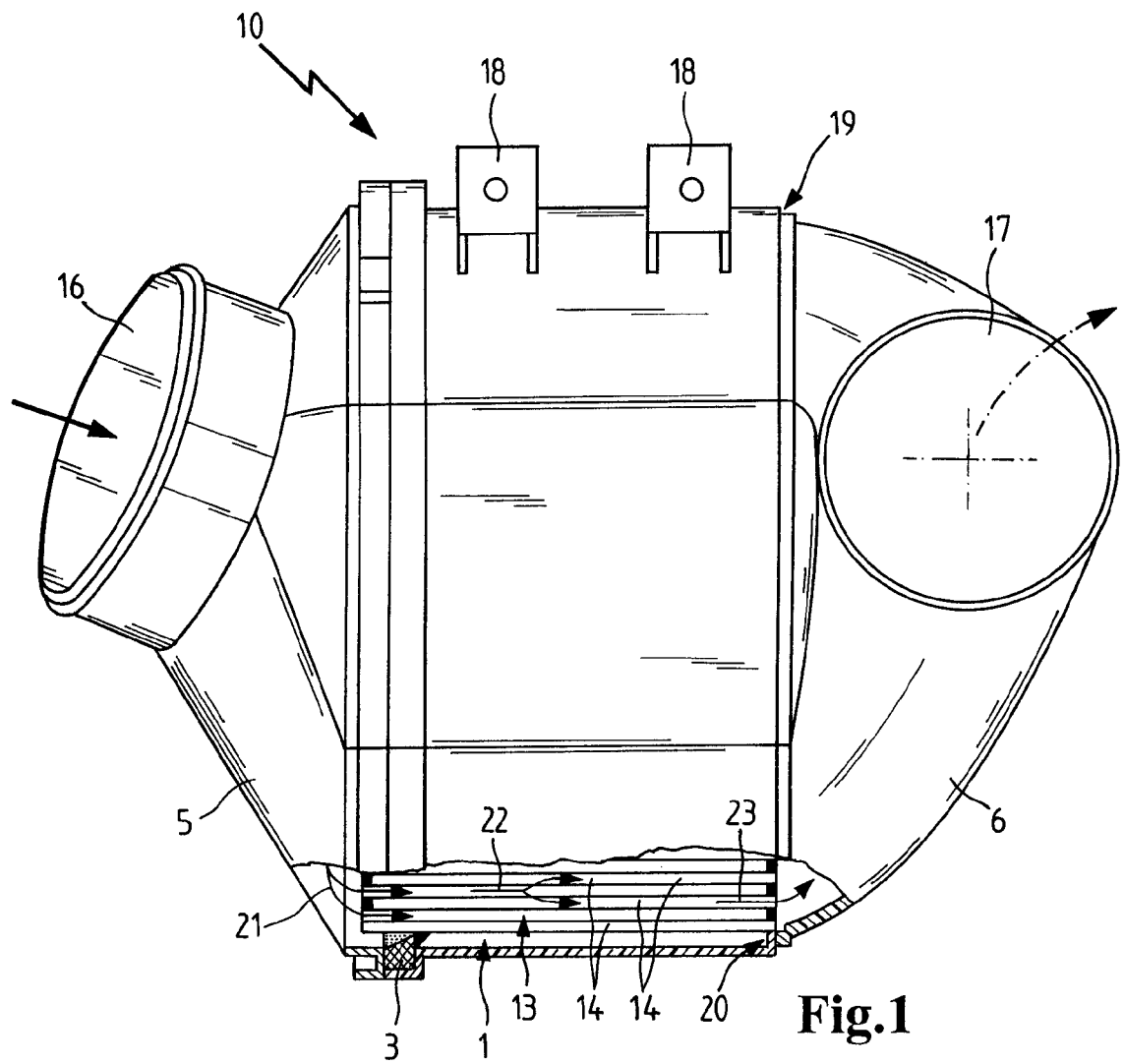
FIG. 1: a schematic illustration of a first embodiment of a filter arrangement.

In FIG. 1 a filter arrangement 10 is illustrated in a principal view with a partial section view in the lower half of the drawing. The filter arrangement 10 has a housing 6 with a cover 5 and an oval filter insert or filter element 1. The cover 5 is designed such that it closes off the housing 6 wherein the housing 6 together with the cover 5 forms a filter housing or a filter receptacle. The filter element 1 comprises a filter coil 13 with alternatingly closed-off passages 14 and a seal 3. The filter coil 13 forms substantially a filter body of the filter element 1. The seal 3 is arranged between the cover 5 and the housing 6. The configuration and arrangement of the seal 3 will be explained in more detail with the following Figures.

The cover 5 has an inlet 16 through which the air to be cleaned can flow into the filter housing. The outlet 17 for the cleaned air is arranged in the housing 6. The filter insert or filter element 1 is arranged in such a way in the filter housing that the inlet 16 is separated seal-tightly from the outlet 17 wherein the filter element 1 extends in axial direction in the housing 6. On the housing 6, which is formed in this embodiment of a two-part configuration, fastening tabs 18 are provided with which the housing 6 is secured in its mounting space. Due to the two-part configuration of the housing 6, it can be produced by injection molding of plastic material in a simple and inexpensive way. The two housing parts are connected seal-tightly with each other at a joining region 19 wherein this connection in the region can be generated by welding or bonding. In the interior of the housing 6, the filter element 1 is supported, in particular axially or radially, on a shoulder 20 which is arranged in the vicinity of the connecting region 19. By means of the configuration of the seal 3 described in the following, it is prevented inter alia that the filter element 1 can perform relative movements relative to the housing 10. In this way, chafe marks at the filter element 1 are prevented.

The air to be cleaned flows through the inlet 16 into the filter housing that is formed by the cover 5 and the housing 6. The not yet cleaned air penetrates in the direction of arrow 21 into the open passages 14 of the filter insert 1. Upon passage (arrows 22) of the air into the neighboring passages 14 which are open in the direction of outlet 17, the contaminants are retained. From these passages 14 which are open in the direction of the outlet 17 the purified air flows out in direction of arrow 23 and exits through outlet 17 from the filter housing.

Figure 2:
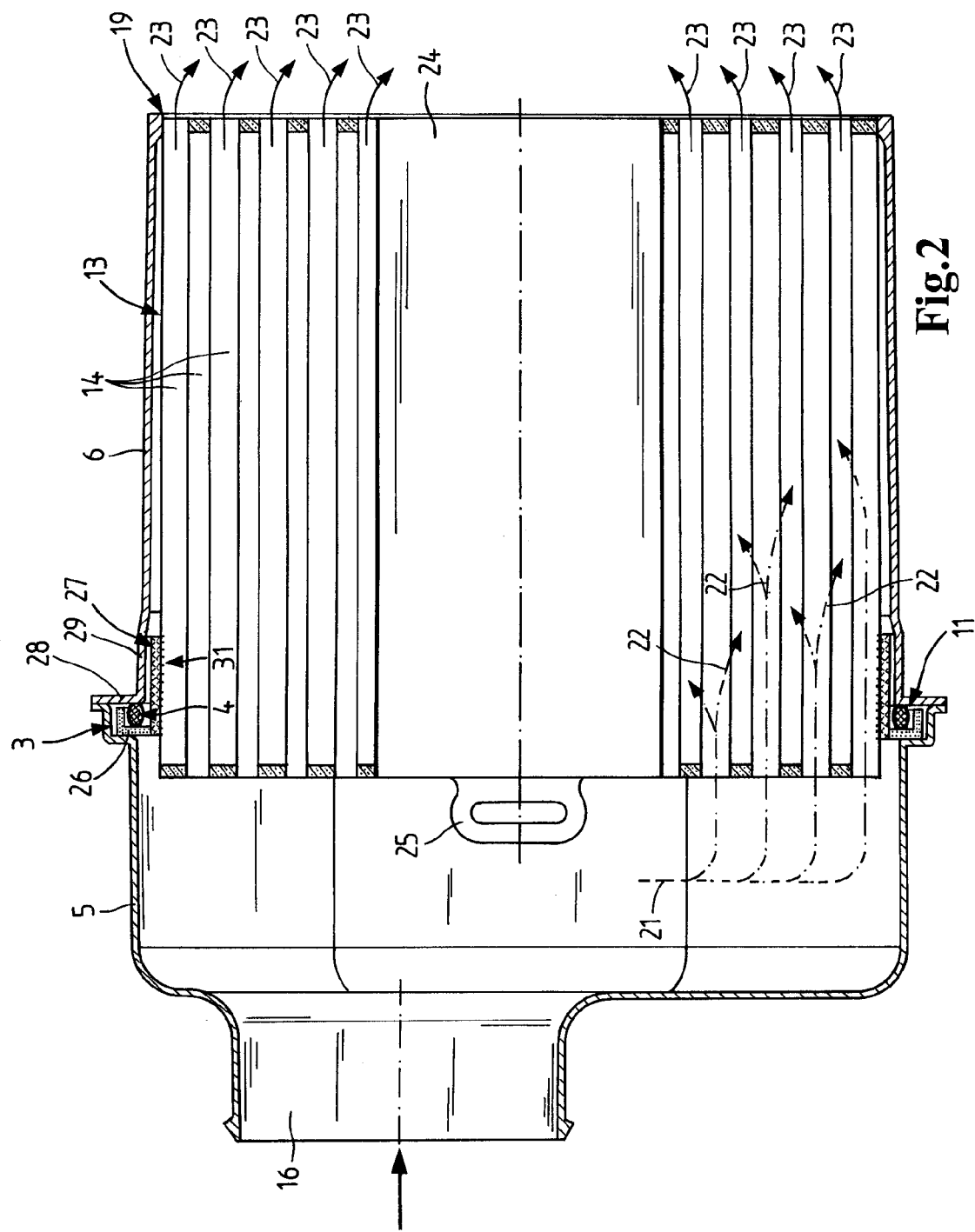
FIG. 2: a partial section view of the first embodiment of a filter arrangement.

In FIG. 2, a detail of the filter arrangement according to FIG. 1 is shown in a section view. Of the two-part housing only the part is illustrated which surrounds the filter insert or the filter element 1. The other part of the housing 6 where the outlet 17 is arranged is not illustrated. The filter coil 13 which is formed of a filter medium with alternatingly closed-off passages 14 is wound spirally about a blade 24. The blade 24 is seal-tightly and non-detachably connected with the filter coil 13. On the side of the blade 24 which is facing the inlet 16, a removal grip 25 is arranged. By means of the removal grip 25, the filter insert or the filter element 12 can be pulled out of the housing 6 after removal of the cover 5.

The seal 3 of the filter element 1 comprises a groove 11 that is embodied in a ring shape about the filter coil, also referred to as a filter body 13, and in which a plastic foam 4 is provided. The seal 3 circumferentially extends along a circumferential line about the filter body 13 that has a cylindrical shape or is oval in horizontal section.

The seal 3 that has a U-shaped profile has a hard component 27 that corresponds to one leg of the U that is resting on the surface of the filter body. The two other legs are manufactured from a soft component 26. An adhesive 31 connects the hard component 27 with the filter body 13. By bonding of the hard component 27 with the soft component 26 and with the adhesive 31, a fixed bond with the filter body 13 is produced wherein the filter body 13 cannot perform axial relative movements relative to the seal 15 formed of hard 27 and soft component 26.

The hard component 27 contacts the oval shaped area 29 of the housing 10 in the area of a sealing support 28. Since the hard component as well as the sealing support 28 of the housing 10 are almost inflexible, the filter element 1 cannot perform relative movements relative to the housing 10. It is also possible to manufacture the U-shaped seal of a single material. In the assembled state, the sealing support 28 compresses the elastic plastic foam 4 which is injected into the groove 11 so that a good sealing action is achieved.

Figure 3:
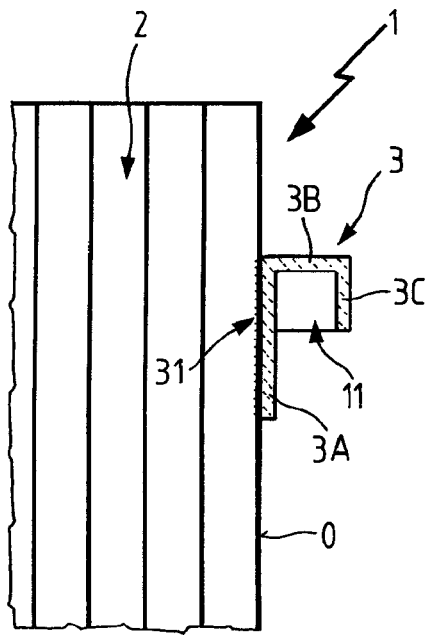
FIGS. 3-6: schematic illustrations for explaining a method for producing a filter element.

FIG. 3 shows schematic illustrations for explaining a method for producing an corresponding filter element as well as a further embodiment of the filter element. In the illustrations 3-6 a detail of a filter element is shown in profile. A filter body 2 is shown that is embodied, for example, cylindrical or as an oval in horizontal section, as illustrated in FIGS. 1 and 2. The filter element 1 comprises thus the filter body 2 and a seal 3 surrounding the filter body 2 circumferentially. The seal 3, as schematically indicated in FIG. 3, is attached to the surface 0 of the filter body 2. This can be done, for example, by bonding.

The seal has in the illustration of FIG. 3 a substantially U-shaped profile that is formed of three legs 3A, 3B, 3C. Between the two parallel legs 3A and 3C the groove 11 is thus formed. The opening of the groove 11 extends thus axially, i.e., parallel to a surface O of the filter body 2. In the illustrated embodiment, the groove 11 has no radial opening, i.e., pointing perpendicularly away from the surface O.

Figure 4:
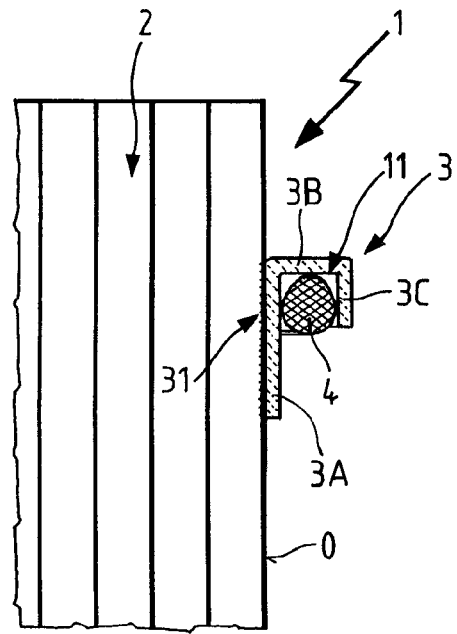

In a corresponding manufacturing process first the filter body 2, for example, of a pleated filter material or a filter coil, is provided. The seal 3 is attached, for example, by means of an adhesive material, circumferentially arranged about the filter body 2. The leg 3A extends, for example, along a circumferential line of the filter body 2. Subsequently, as illustrated in FIG. 4, a preferably thixotropic plastic foam 4 is injected or cast into the groove. The introduction of the plastic foam, for example, containing PU, can be realized by means of an injection nozzle or by other conventional extrusion mechanisms. In the illustration of FIG. 4, the groove is substantially filled out with the plastic foam 4. The foam 4 solidifies during its reaction time and produces as a consequence a flexible filling of the groove 11.

Figure 5:
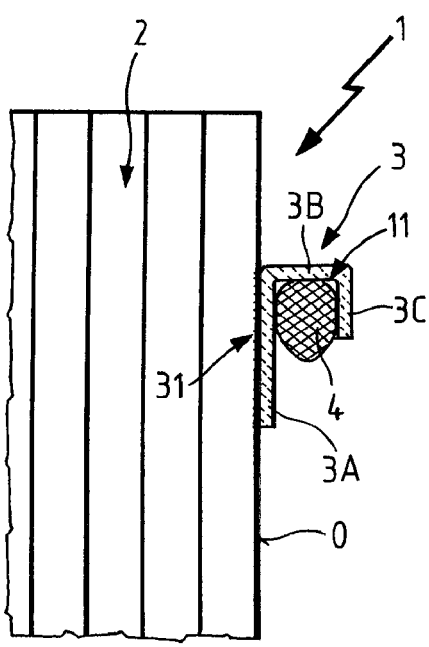

Upon reaction or solidification or curing of the plastic foam 4, its volume may enlarge. This is illustrated in FIG. 5. The plastic foam 4, which is circumferentially extending with the seal 3 about the filter body, projects from the groove of the sealing profile. By means of the quantity of injected plastic foam material it can be adjusted how much the plastic foam 4 will project from the groove in the solidified state. This may also be referred to as a sealing height that results from the leg 3B and the greatest expansion of the plastic foam 4. In this context, the resulting sealing height in the proposed sealing arrangement is flexibly adjustable and can be matched to the conditions of the mounting site of the filter element 1. For example, standardized sealing profiles can be pre-manufactured into which plastic foam beads of different strength or thickness are injected for different filter element types. Accordingly, a uniform and simple manufacturing method for different filter types can be realized.

Figure 6:
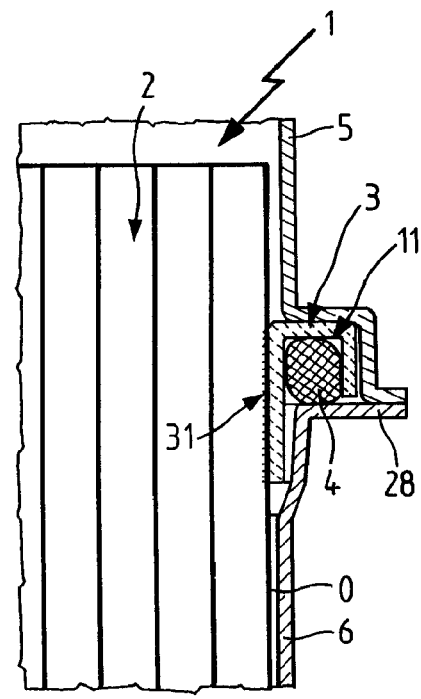

In FIG. 6 a typical mounting situation for a filter element 1 in a filter housing is illustrated. In this context, as already indicated in FIGS. 1 and 2, the filter element 1 is inserted together with the seal 3 into a housing 6. The housing 6 provides a sealing support 28 on which the seal 3, in particular with the elastic plastic foam 4, rests and against which it can be pressed. The pressing action is realized by means of the cover 5 that, on the one hand, compresses the seal 3 and, on the other hand, presses onto the sealing support 28 of the housing 6. Therefore, as illustrated in FIG. 6, a particularly good sealing action that is circumferentially extending about the filter body 2 results between a clean air region and a raw air region which, in the orientation of FIG. 6, are located above and below the filter body 2.

Figure 7:
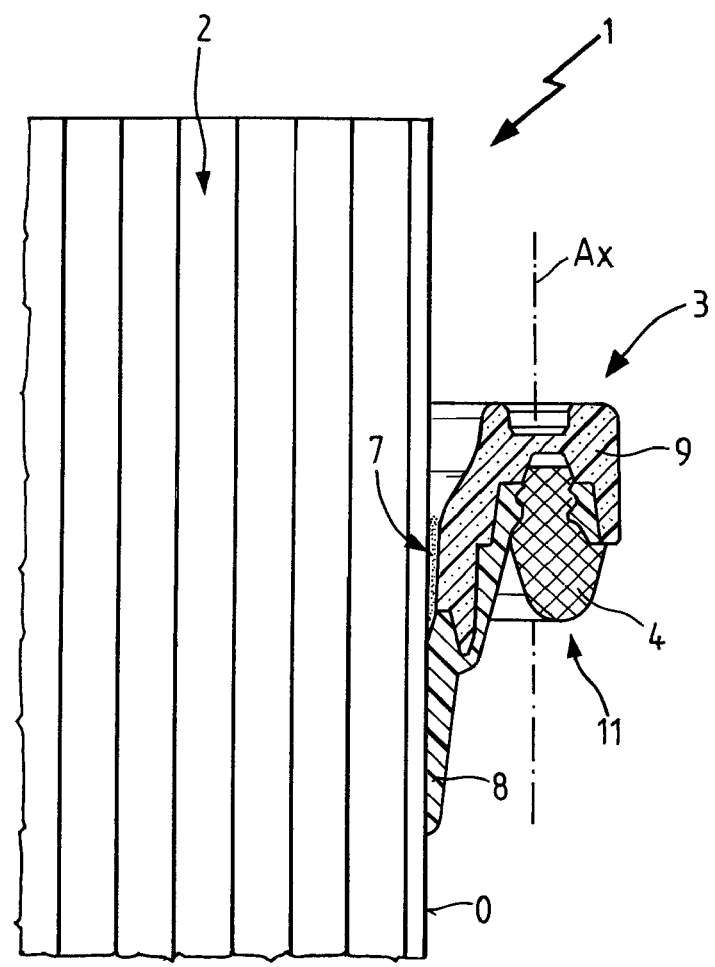
FIG. 7: a partial section view of a second embodiment of a filter element.

FIG. 7 shows a further embodiment of a filter element 1. FIG. 7 shows a detail of the filter element 1 with a filter body 2 that is, for example, designed as a filter coil. In profile, one can see a seal 3 which is attached to the surface O so as to circumferentially extend about the filter coil or filter body 2. The embodiment of the seal 3 is of a multi-part configuration. A first flat sealing segment 8 that is comprised, for example, of a hard component, i.e., a plastic material that is particularly stable, is resting on the surface O of the filter body 2. A second sealing segment 9, for example, of a softer plastic component, forms a groove or trough 11 into which preferably PU foam 4 is injected. The attachment of the seal 3 on the filter body is realized, for example, by means of an adhesive 7 that forces like a wedge the second sealing part 9 forming the groove 11 in radial direction outward away from the filter body 2.

In FIG. 7, an axis Ax is illustrated in dashed lines which extends parallel to a longitudinal axis of the filter body 2. As already explained in connection with FIG. 6, a sealing action along this axis Ax is realized, for example, by pressing together or compressing the seal 3 by housing support surfaces. The seal provides thus an axial sealing action and, only to a limited extent, a radial sealing action, i.e., acting perpendicular to the filter body 2. When the part 9 of the seal 3 that forms the groove 11 comprises a soft component that, for example, corresponds with regard to its flexibility to the PU foam 4, the entire area of the seal 3 which projects approximately radially away from the filter body 2 can be compressed and can serve as a sealing material, for example, between support surfaces. On the other hand, the sealing area 8 that is embodied as a hard component provides a particularly stable attachment and prevents relative movements of the entire filter element in the receptacle or the housing, not illustrated here.

The proposed filter element with the axially acting sealing concept which comprises PU foam and can be produced in particular with thixotropic PU foam leads to cost savings and simplified stock keeping because any sealing height can be achieved by the design of the foamed-in plastic 4. The actual circumferentially extending sealing ring must therefore not be matched to different filter element types. The sealing ring that forms the groove can be produced, for example, from a two-component plastic part. In this context, the sealing profiles are conceivable, for example, in the form of continuous material or pre-manufactured rings that can be pushed over a filter body and attached thereto.

Even though the present invention has been explained with the aid of preferred embodiments, it is not limited thereto but can be modified in many ways.

The invention claimed is:

1. A filter element for intake air of an internal combustion engine of a motor vehicle or of a compressor, comprising:
   a filter body having circumferential outer surface and axially opposing end faces; and
   a seal arrangement;
   wherein the seal arrangement comprises:
      a seal member arranged on and secured onto the circumferential outer surface of the filter body and arranged between the end faces and spaced axially away from the end faces, the seal member arranged so as to circumferentially extend about the filter body on the circumferential outer surface;
   wherein the seal member is a ring-shaped seal member having a U-shaped cross-section, the seal member having:
      a first axially leg extending axially and arranged on and contacting the circumferential outer surface of the filter body;
      a third axially extending leg substantially parallel to the first leg and spaced radially outwardly away from the first leg;
      a radially outwardly projecting second leg projecting outwardly substantially perpendicular to the circumferential outer surface of the filter body, the second leg having opposing ends connected directly onto an axial end of the first leg and to an axial end of the third leg;
      wherein the first and third legs are substantially parallel to each other and to the circumferential outer surface of the filter body;
      wherein the first, second and third leg form the U-shaped cross section;
   wherein the seal member forms a groove inside the seal member, the groove opening to the exterior of the seal member on a first side of the seal member;
   an elastic plastic foam operable to form a seal is arranged in the groove.

2. The filter element according to claim 1, wherein the groove opening is oriented to open from the seal member is a direction parallel to the circumferential outer surface of the filter body.

3. The filter element according to claim 1, wherein the plastic foam is a polyurethane material.

4. The filter element according to claim 1, wherein the plastic foam comprises a material, which upon injection into the groove, is thixotropic.

5. The filter element according to claim 1, wherein the plastic foam in the groove projects outwardly from of the groove and outwardly from the seal member.

6. The filter element according to claim 1, wherein
at least one of the legs of the seal member is a soft component;
at least one of the legs of the seal member is hard component;

wherein the at least one soft component legs is bonded onto the at least one hard component legs.

7. The filter element according to claim 1, wherein the first leg has a hard component leg portion joined to a soft component leg portion, the hard component leg portion bonded onto a soft component leg portion forming the first leg;

wherein the hard component leg portion lies on and contacting the circumferential outer surface of the filter body;

wherein the soft component leg portion is arranged on a radially interior side of the hard component leg portion and is spaced radially outwardly away from the circumferential outer surface of the filter body.

8. The filter element according to claim 7, wherein at least one leg of the seal member is adhesively bonded directly onto circumferential outer surface of the filter body.

9. A method for producing the filter element according to claim 1, comprising:

providing a filter body;

providing a ring-shaped seal member having a U-shaped cross-section, the seal member having:

a first leg;

a third leg substantially parallel to the first leg and spaced radially outwardly away from the first leg;

a radially outwardly projecting second leg connected directly at opposing ends onto an axial end of the first leg and to an axial end of the third leg;

wherein the first and third legs are substantially parallel to each other;

wherein the first, second and third leg form the U-shaped cross section;

wherein the seal member forms a groove inside the seal member, the groove opening to the exterior of the seal member on a first side of the seal member;

arranging the seal member on a circumferential outer surface of the filter body between and spaced away from axial end faces of the filter body;

attaching the first leg of the seal member onto a circumferential outer surface of the filter body so as to circumferentially extend about the filter body;

injecting an elastic plastic foam into the groove through a groove opening of the seal member so as to at least partially fill the groove to form a seal arrangement.

\* \* \* \* \*